United States Patent
Wang et al.

(10) Patent No.: US 9,485,294 B2
(45) Date of Patent: Nov. 1, 2016

(54) METHOD AND APPARATUS FOR PROCESSING VIDEO STREAM

(71) Applicant: Huawei Technologies Co., Ltd., Shenzhen (CN)

(72) Inventors: Dong Wang, Beijing (CN); Changqi Hu, Shenzhen (CN); Peiyun Di, Shenzhen (CN); Jun Yao, Shenzhen (CN); Xin Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 14/081,491

(22) Filed: Nov. 15, 2013

(65) Prior Publication Data

US 2014/0108605 A1    Apr. 17, 2014

Related U.S. Application Data

(63) Continuation of application No. PCT/CN2013/075650, filed on May 15, 2013.

(30) Foreign Application Priority Data

Oct. 17, 2012    (CN) .......................... 2012 1 0394231

(51) Int. Cl.
*H04N 7/173*    (2011.01)
*H04L 29/06*    (2006.01)

(52) U.S. Cl.
CPC ......... *H04L 65/602* (2013.01); *H04L 65/4084* (2013.01); *H04L 65/605* (2013.01)

(58) Field of Classification Search
None
See application file for complete search history.

(56) References Cited

U.S. PATENT DOCUMENTS

| | | | | |
|---|---|---|---|---|
| 5,517,253 A | * | 5/1996 | De Lange | ................ G09G 5/14 348/513 |
| 7,317,490 B2 | | 1/2008 | Shin | |
| 8,558,954 B2 | | 10/2013 | Yuki | |
| 2001/0005400 A1 | * | 6/2001 | Tsujii | ..................... G11B 27/11 375/240.29 |

(Continued)

FOREIGN PATENT DOCUMENTS

| | | |
|---|---|---|
| CN | 1581949 A | 2/2002 |
| CN | 101442650 A | 5/2009 |
| CN | 101742155 A | 6/2010 |

OTHER PUBLICATIONS

"Chinese International Search Report," International Application No. PCT/CN2013/075650, mailing date: Aug. 22, 2013, 14 pages.

(Continued)

*Primary Examiner* — John Schnurr
*Assistant Examiner* — Cynthia Fogg
(74) *Attorney, Agent, or Firm* — Slater Matsil, LLP

(57) ABSTRACT

Disclosure of the present invention provide a method and an apparatus for processing a video stream. The method includes: acquiring a request message from a terminal, where the request message carries address information of multiple sub video screens, according to the address information, acquiring multiple substreams corresponding to the multiple sub video screens in a one-to-one manner, merging the multiple substreams into a single stream, and generating an indication message used to indicate a picture parameter of the single stream, and sending the single stream and the indication message to the terminal, so that the terminal decodes the single stream and displays decoded multiple sub video screens according to the indication message.

14 Claims, 7 Drawing Sheets

(56) References Cited

U.S. PATENT DOCUMENTS

| | | | | |
|---|---|---|---|---|
| 2002/0067907 | A1* | 6/2002 | Ameres | H04N 21/23106 386/354 |
| 2003/0159143 | A1* | 8/2003 | Chan | H04N 5/45 725/41 |
| 2005/0036068 | A1* | 2/2005 | Shin | H04N 5/44591 348/565 |
| 2007/0204302 | A1 | 8/2007 | Calzone | |
| 2009/0285307 | A1 | 11/2009 | Cao et al. | |
| 2011/0249177 | A1* | 10/2011 | Chen | H04N 21/2347 348/388.1 |

OTHER PUBLICATIONS

"Series H: Audiovisual and Multimedia Systems: Infrastructure of audiovisual services-Coding of moving video," ITU-T, Telecommunication Standardization Sector of ITU, H.264, May 2003, 271 pages.

\* cited by examiner

METHOD AND APPARATUS FOR PROCESSING VIDEO STREAM

This application is a continuation of International Application No. PCT/CN2013/075650, filed on May 15, 2013, which claims priority to Chinese Patent Application No. 201210394231.6, filed on Oct. 17, 2012, both of which are hereby incorporated herein by reference in their entireties.

TECHNICAL FIELD

The present disclosure relates to the field of information technologies, and in particular, to a method and an apparatus for processing a video stream.

BACKGROUND

With the development of video coding and decoding technologies and network technologies, streaming media technologies are used widely. For example, a user may preview a type of films or other video clips in a manner such as "on demand," and in this way, multiple downsized video clips need to be displayed on a terminal at the same time. A direct solution is that the terminal acquires multiple streams corresponding to the video clips from a server, decodes the streams and plays the streams in corresponding positions.

Currently, a processor used in a handheld terminal or a non-personal computer (non-PC) terminal usually adopts hardware decoding, that is, a hardware decoding core is embedded in a processor. However, not all processors support multistream decoding. In chips supporting the multistream decoding, most of the chips handle the problem by using a method of time division, that is, multiple streams are decoded at the same time in a manner of adopting time division in a decoding core, for example, PowerVR graphic core series. However, when the manner of the time division is used, a switchover between decoding processes of the streams is required, thereby resulting in a loss of decoding performance and meanwhile increasing additional control logics.

SUMMARY OF THE INVENTION

Embodiments of the present invention provide a method and an apparatus for processing a video stream, which are capable of improving the decoding performance of a terminal.

In one aspect, a method for processing a video stream is provided, where the method includes acquiring a request message from a terminal, where the request message carries address information of multiple sub video screens, according to the address information, acquiring multiple substreams corresponding to the multiple sub video screens in a one-to-one manner, merging the multiple substreams into a single stream, and generating an indication message used to indicate a picture parameter of the single stream, and sending the single stream and the indication message to the terminal, so that the terminal decodes the single stream and displays decoded multiple sub video screens according to the indication message.

In another aspect, an apparatus for processing a video stream is provided, where the apparatus includes a first acquisition unit, configured to acquire a request message from a terminal, where the request message carries address information of multiple sub video screens, a second acquisition unit, configured to, according to the address information, acquire multiple substreams corresponding to the multiple sub video screens in a one-to-one manner, a generation unit, configured to merge the multiple substreams into a single stream, and generate an indication message used to indicate a picture parameter of the single stream, and a sending unit, configured to send the single stream and the indication message to the terminal, so that the terminal decodes the single stream and displays decoded multiple sub video screens according to the indication message.

In the embodiments of the present invention, by merging multiple substreams into a single stream, the terminal is capable of displaying multiple sub video screens by decoding the single stream, so that the decoding switchover between the multiple substreams is not required, and therefore, the decoding performance of the terminal can be improved.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and comprehensively describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
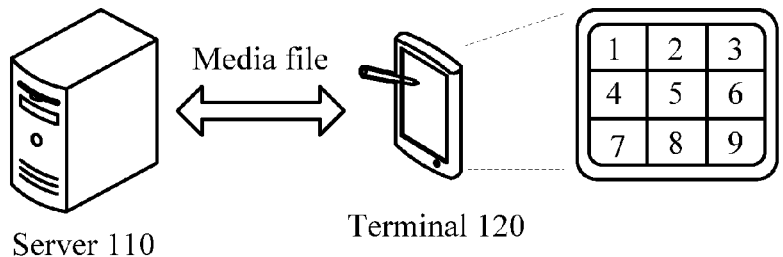
FIG. 1 is a schematic diagram of an example of a network scenario where an embodiment of the present invention is applicable.

FIG. 1 is a schematic diagram of an example of a network scenario where an embodiment of the present invention is applicable. It should be noted that the example shown in FIG. 1 is merely for helping a person skilled in the art to better understand the embodiment of the present invention, and is not intended to limit the scope of the embodiment of the present invention.

In FIG. 1, a server 110 may be a server in a streaming media technology, for example, a streaming media server. A terminal 120 may be a terminal capable of playing streaming media, for example, a mobile phone, a portable computer, a personal digital assistant, or a portable multimedia machine.

In the streaming media technology, the server 110 may store multiple media files, for example, a film or other videos. A user may initiate a medium file access request to the server 110 through the terminal 120, the server 110 may deliver the to-be-accessed media file to the terminal 120 through a network after the server 110 receives the request, and the terminal 120 plays the media file.

For the terminal 120, due to reasons such as a preview or "on demand", there is a demand for decoding and displaying multiple small screens on the terminal 120 at the same time. For example, when a user hopes to preview a type of films or other video clips in an "on demand" environment, multiple downsized video clips rather than a single video clip are displayed on the terminal at the same time. The merge of the small screens may be dynamic and diversified. For example, due to demands such as "on demand", 9 small screens may be displayed on the terminal 120 shown in FIG. 1. It should be noted that the number herein is merely an example for description, and is not intended to limit the scope of the embodiment of the present invention.

To make the terminal 120 capable of displaying multiple small screens, it is required to process a video stream. A method for processing a video stream in an embodiment of the present invention is described below in detail.

Figure 2:
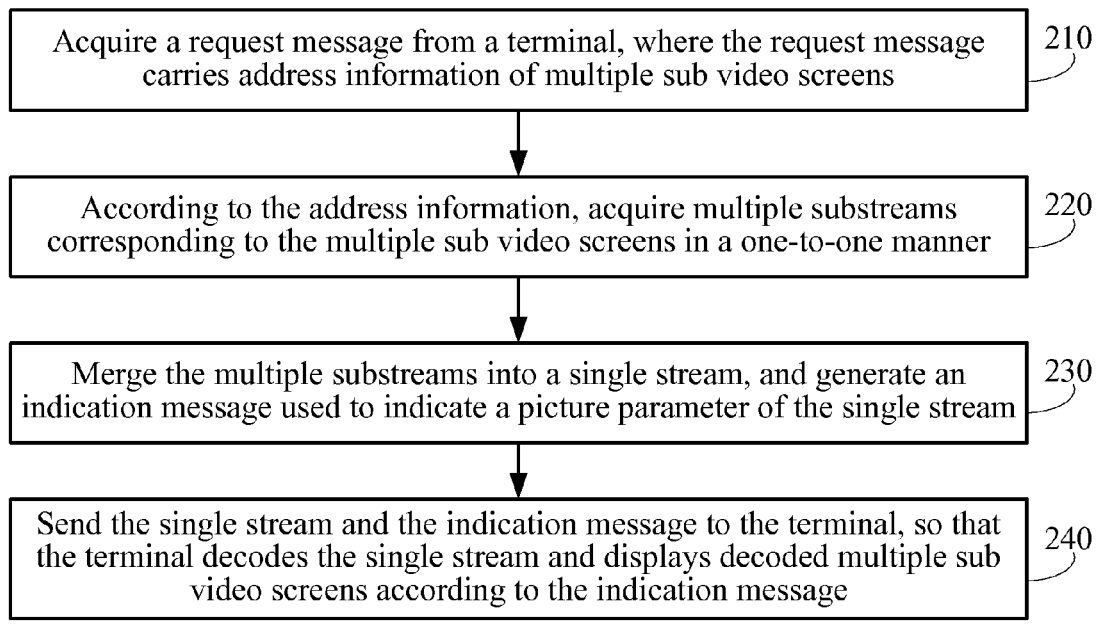
FIG. 2 is a schematic flow chart of a method for processing a video stream according to an embodiment of the present invention.

FIG. 2 is a schematic flow chart of a method for processing a video stream according to an embodiment of the present invention. The method shown in FIG. 2 is executed by an apparatus for processing a video stream.

210: Acquire a request message from a terminal, where the request message carries address information of multiple sub video screens.

In the embodiment of the present invention, the multiple sub video screens may be videos such as videos subscribed on demand through the terminal or customized by the user through the terminal. The address information of the multiple sub video screens may include a uniform resource locator (url), and may further include other address content, which is not limited in the embodiment of the present invention.

220: According to the address information, acquire multiple substreams corresponding to the multiple sub video screens in a one-to-one manner.

230: Merge the multiple substreams into a single stream, and generate an indication message used to indicate a picture parameter of the single stream.

240: Send the single stream and the indication message to the terminal, so that the terminal decodes the single stream and displays decoded multiple sub video screens according to the indication message.

In the embodiment of the present invention, the apparatus for processing a video stream may directly merge multiple substreams into a single stream without the need of decoding the multiple substreams first, and then compress and code the multiple sub videos, obtained through the decoding, into a single stream, and therefore, the processing efficiency can be improved. In addition, the terminal is capable of displaying multiple sub video screens by decoding a single stream; in this way, the terminal only needs to support normal video decoding, and does not need to decode the multiple substreams at the same time and perform the decoding switchover; in this way, the decoding performance of the terminal can be improved, and the convenience of service implementation can be improved.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of the service implementation can be improved.

Optionally, as an embodiment, in step 230, the apparatus for processing a video stream may arrange the multiple substreams according to a top-to-bottom arrangement mode of the multiple sub video screens, and merge arranged multiple substreams into a single stream, and generate an indication message, where the indication message includes first information and slice data information of each substream, the first information may indicate a picture size parameter of the single stream, and the slice data information of each substream indicates a start position of each substream in the single stream.

Specifically, frame structures of the multiple substreams may be the same, that is, picture types of frames of pictures in the multiple substream may be the same, and widths of the frames of pictures in the multiple substreams may be the same. The apparatus for processing a video stream may arrange the frames of pictures in the multiple substreams according to the top-to-bottom mode, and merge arranged frames of pictures in the multiple substreams into frames of pictures in the single stream. The picture size parameter, indicated by the first information, of the single stream may include a height and a width of each frame of picture in the single stream, and the height of each frame of picture in the single frame may be the sum of the heights of the pictures of the multiple substreams. Because the single stream is formed through merge according to the top-to-bottom mode, the width of each frame of picture in the single stream may be a width of a picture of each substream.

In the embodiment of the present invention, the apparatus for processing a video stream merges the multiple substreams into the single stream according to the top-to-bottom mode; therefore, after the terminal decodes the single stream, the terminal may arrange corresponding multiple substreams according to a layout mode, required by the terminal, of the multiple sub video screens, so as to display the multiple sub video screens according to a required layout mode.

Optionally, as another embodiment, in step 210, the request message may further carry layout information, where the layout information may indicate a layout mode of the multiple sub video screens. In step 230, the apparatus for processing a video stream may arrange the multiple substreams according to the layout mode, and merge arranged multiple substreams into the single stream.

In the embodiment of the present invention, the apparatus for processing a video stream arranges the multiple substreams according to the layout mode requested by the terminal, and merges the multiple substreams into the single stream; therefore, after the terminal decodes the single stream, the terminal does not need to arrange the multiple substreams again and may directly display the multiple sub video screens according to the layout mode, and the convenience of the service implementation can be improved.

Optionally, as another embodiment, in step 230, the apparatus for processing a video stream may arrange the multiple substreams according to the layout mode, and merge arranged multiple substreams into the single stream. In this way, the apparatus for processing a video stream may generate an indication message, and the indication message includes first information, second information, and slice data information of each substream, where the first information may indicate a picture size parameter of the single stream, the second information may indicate a slice group parameter of each substream, and the slice data information of each substream may indicate a start position of each sub stream in the single stream.

Specifically, frame structures of the multiple substreams may be the same, that is, picture types of the frames of pictures in the multiple substreams may be the same. The picture size parameter, indicated by the first information, of the single stream may include a height and a width of each frame of picture in the single stream. The slice group parameter, indicated by the second information, of each substream may include a slice group type of each substream, the number of slice groups of each substream, and a parameter of a position of each slice in each substream.

Optionally, as another embodiment, in step 230, the apparatus for processing a video stream may arrange the multiple substreams according to the layout mode, and merge arranged multiple substreams into the single stream. In this way, the apparatus for processing a video stream may generate an indication message, and the indication message includes third information, where the third information may indicate a picture size parameter of the single stream, the number of substreams, a parameter of a position of each substream in the single stream, and the number of slices in each substream.

Specifically, frame structures of the multiple substreams may be the same. The apparatus for processing a video stream may indicate a related parameter of the single stream through the third information. The picture size parameter of the single stream may include a height and a width of each frame of picture in the single stream.

In addition, the third information may be located in front of a first slice of the single stream; after the terminal receives the third information, the terminal may decode the single stream according to the parameter indicated by the third information. If the terminal does not receive the third information, the terminal may decode the received substream according to the prior art.

Optionally, as another embodiment, in step 230, in addition to the third information included in the indication message, the indication message may further include picture information of each substream and slice group information of each substream, where the picture information of each substream may indicate a picture size parameter of each substream, and the slice group information of each substream indicates a slice group parameter of each substream.

Specifically, the indication message may indicate a related parameter of the single stream through the third information, and may further include a specific parameter of each substream. In this way, when frame structures of the multiple substreams are different, the terminal may decode the single stream according to the third information, and decode each substream according to the picture information and the slice group information of each substream. The picture information and the slice group information of each substream may be located in front of a first slice of each substream. Therefore, the embodiment of the present invention may be applied in a condition in which frame structures of multiple substreams are different.

Optionally, as another embodiment, in step 230, the apparatus for processing a video stream may arrange the multiple substreams according to the layout mode, and merge arranged multiple substreams into the single stream. In this way, the apparatus for processing a video stream may generate an indication message, and the indication message may include first information and additional information, where the first information may indicate a picture size parameter of the single stream, and the additional information may indicate the number of substreams, a parameter of a location of each substream in the single stream, and the number of slices in each substream.

Optionally, as another embodiment, under of the above manner of merging multiple substreams into a single stream, in a process in which each substream is coded, a reference picture directed to by a motion vector may be set to be not beyond a picture border corresponding to each substream. Because a border of a picture of each substream may possibly not be the border any longer after multiple substreams are merged into a single stream, to avoid that an error occurs on the decoding of the single stream formed through merge, it is required to set a reference picture directed to by a motion vector to be not beyond a picture border corresponding to each substream.

Optionally, as another embodiment, in step 210, the request message may further carry layout information, where the layout information may indicate that a layout mode of the multiple sub video screens is an N-grid mode, where the N is a positive integer greater than or equal to 2. In step 230, each substream is copied into N copies, and the N copies of each substream are arranged according to an N-grid mode; and a copy in a corresponding position is selected from the N copies of each substream according to a position of a sub video screen corresponding to each substream in the layout mode, and selected copies are merged into a single stream.

Specifically, the apparatus for processing a video stream may copy each substream into N copies, and arrange the N copies of each substream according to the N-grid mode and store the N copies; in this way, each substream has a copy when each substream is located in a different position of N grids. In this way, when the layout mode requested by the terminal is the N-grid mode, according to a position of a sub video screen corresponding to each substream in the N-grid mode requested by the terminal, copies in corresponding positions are selected from the N copies of each substream, and selected copies are merged into a single stream. Therefore, the embodiment of the present invention is capable of improving the convenience of service implementation.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of the service implementation can be improved.

The embodiment of the present invention is described below in detail with reference to specific examples. It should be noted that the examples are for helping a person skilled in the art to better understand the embodiment of the present invention, and are not intended to limit the scope of the embodiment of the present invention.

Figure 3:
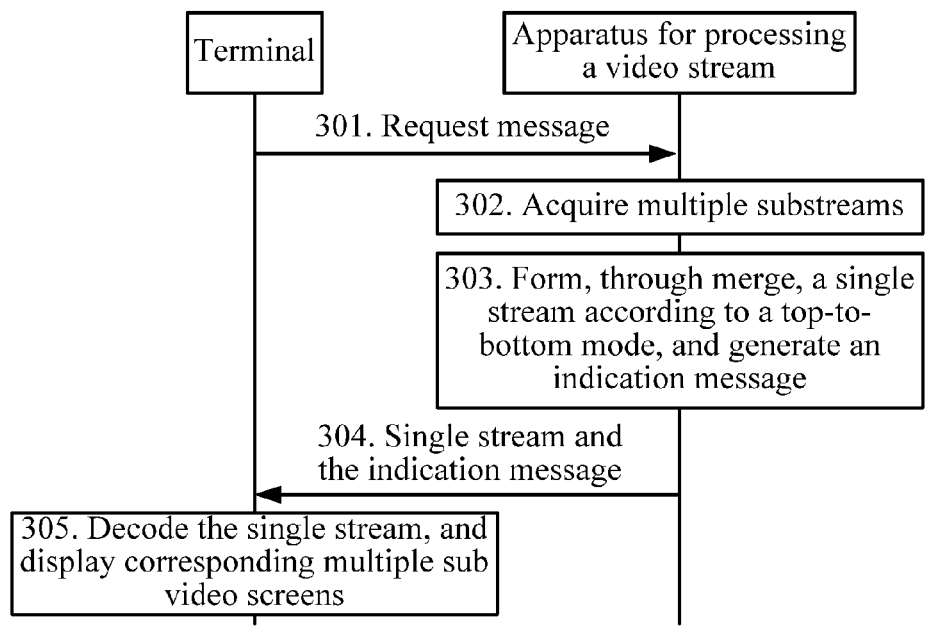
FIG. 3 is a schematic flow chart of a process of a method for processing a video stream according to an embodiment of the present invention.

FIG. 3 is a schematic flow chart of a process of a method for processing a video stream according to an embodiment of the present invention. In FIG. 3, the description is made through an example in which the coding and decoding are performed by adopting an H.264 (or an MPEG4 AVC PART 10) standard.

301: An apparatus for processing a video stream acquires a request message from a terminal, where the request message carries address information of multiple sub video screens.

302: The apparatus for processing a video stream may acquire corresponding multiple substreams according to the address information in step 301.

For example, the address information may include a url. The apparatus for processing a video stream may acquire multiple substreams from a server according to urls of multiple sub video screens.

It is assumed herein that frame structures of the multiple substreams are the same, that is, picture types of the frames of pictures in the multiple substreams are the same.

In addition, because a border of a picture of each substream may not be a border after the substreams are merged into a single stream, in a process in which each substream is coded, a reference picture directed to by a motion vector may be set to be not beyond a picture border corresponding to each substream.

303: The apparatus for processing a video stream arranges multiple substreams according to a top-to-bottom mode, merges the multiple substreams into a single stream; and generates an indication message, where the indication message may include first information and slice data information of each substream, the first information indicates a picture size parameter of the single stream, and the slice data information of each substream indicates a start position of each substream in the single stream.

Specifically, the apparatus for processing a video stream may arrange the frames of pictures in the multiple substreams according to the top-to-bottom mode, and merge arranged frames of pictures in the multiple substreams into the single stream. In this way, the arrangement mode of slices of the multiple substreams may still be a raster scan mode, and an arbitrary slice order mode does not need to be used, so that the single stream may be formed through merge in a non-baseline profile.

According to the parameter definition in an H.264 standard, the first information may be sequence parameter set (sps) information, where the sps information may be used to indicate a picture size parameter of the single stream, and a process for generating the sps information may be as follows:

(1) Because sps information of the multiple substreams are the same, the apparatus for processing a video stream may select sps information of any substream.

(2) The apparatus for processing a video stream may obtain a parameter pic_height_in_map_units_minus1 in the sps information by parsing, and set a value of the parameter to a height value of a picture of the single stream minus 1, where a unit of the height value is a map unit. According to different definition of the substream, a map unit may include one macroblock (MB) or two macroblocks, which is not limited in the embodiment of the present invention. Because the multiple substreams are merged into the single stream according to the top-to-bottom mode and a width value of a picture of the single stream is a width value of a picture of each substream, the parameter pic_width_in_mbs_minus1 in the sps information may be kept unchanged, where the parameter pic_width_in_mbs_minus1 indicates the width of the picture of the single stream minus 1, and the unit of the width value is a macroblock.

(3) Value of other parameters in the sps information may be kept unchanged; for the specific definition of the other parameters, reference may be made to the H.264 standard. The apparatus for processing a video stream may align bytes corresponding to the other parameters in the sps information.

According to the definition in an H.264 standard, slice header data in the slice data information of each substream may indicate a start position of each substream in the single stream. Specifically, the apparatus for processing a video stream sets a parameter first_mb_in_slice in the slice head data of each substream, where the parameter first_mb_in_slice indicates a position of a first macroblock of a picture of each substream in a picture of the single stream, that is, the start position of each substream in the single stream.

In addition, the slice data information of each sub stream may further include a frame number parameter frame_num and an instantaneous decoding refresh (IDR) picture identity parameter idr_pic_id. The frame_num and the idr_pic_id of each substream are correspondingly set.

304: The apparatus for processing a video stream sends the single stream and the indication message in step 303 to the terminal.

305: The terminal decodes the single stream according to the indication message, to obtain multiple substreams, arranges the multiple substreams according to a required layout mode, and displays corresponding multiple sub video screens.

Figure 4:
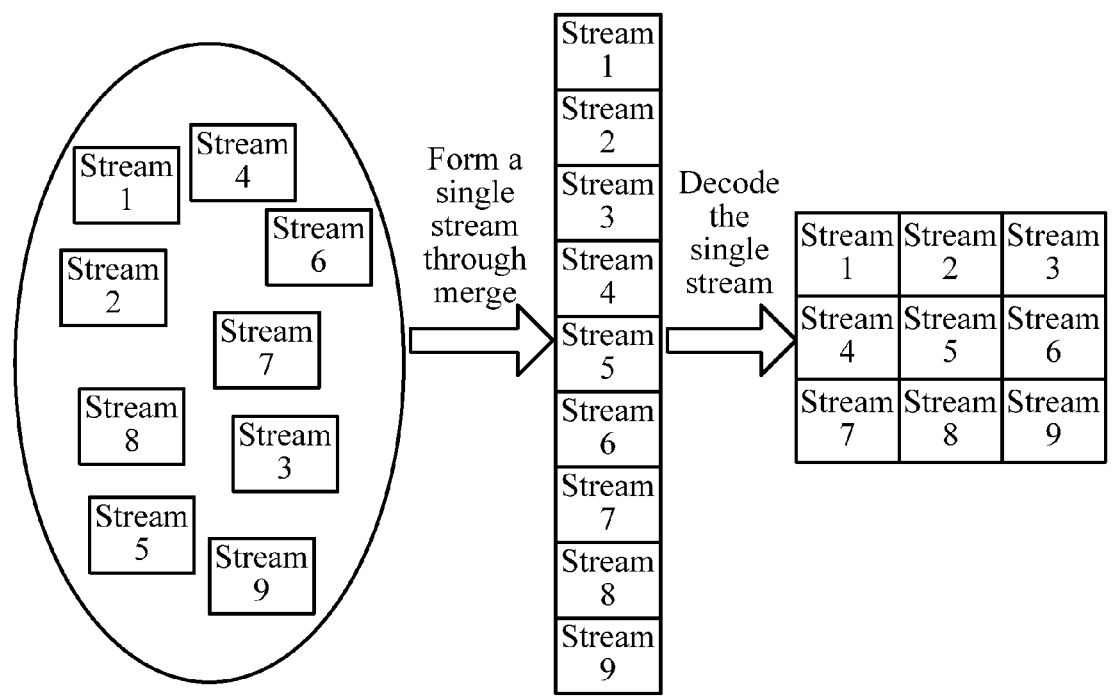
FIG. 4 is a schematic diagram of an example of a process for forming, through merge, and decoding a single stream by using the embodiment shown in FIG. 3.

FIG. 4 is a schematic diagram of an example of a process for forming, through merge, and decoding a single stream by using the embodiment shown in FIG. 3. In FIG. 4, it is assumed that the number of sub video screens is 9, and the layout mode is a 9-grid mode. After the terminal decodes the single stream, the terminal arranges the 9 substreams according to the 9-grid mode and displays them.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of service implementation can be improved.

Figure 5:
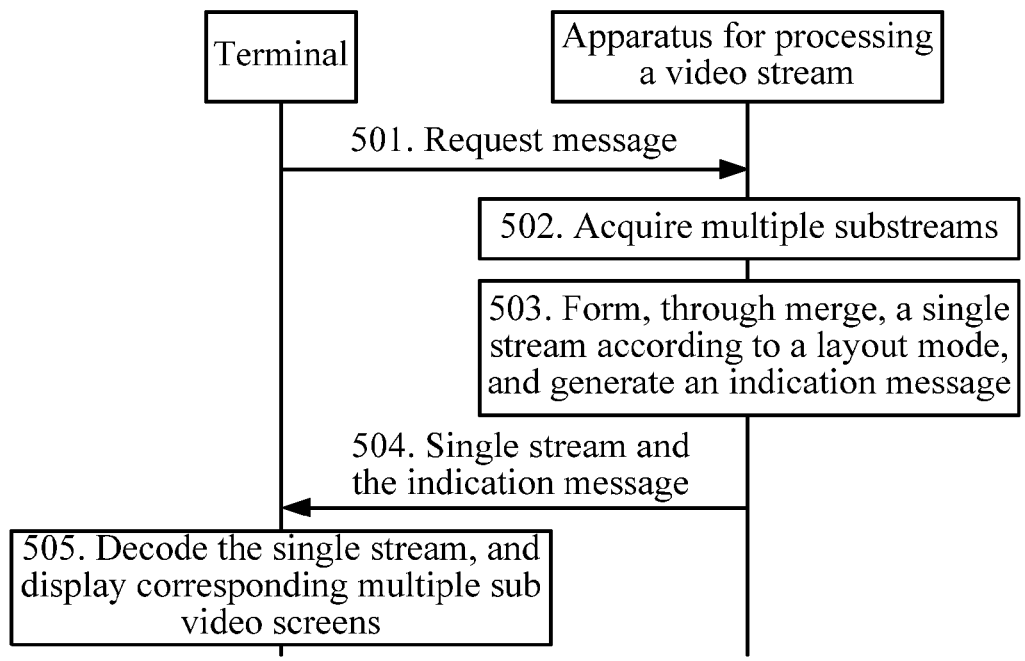
FIG. 5 is a schematic flow chart of a process of a method for processing a video stream according to another embodiment of the present invention.

FIG. 5 is a schematic flow chart of a process of a method for processing a video stream according to another embodiment of the present invention. In FIG. 5, the description is made through an example in which the coding and decoding are performed by adopting an H.264 (or an MPEG4 AVC PART 10) standard.

501: An apparatus for processing a video stream acquires a request message from a terminal, where the request message carries address information of multiple sub video screens and layout information of the multiple sub video screens, and the layout information indicates a layout mode of the multiple sub video screens.

502: The apparatus for processing a video stream acquires corresponding multiple substreams according to the address information in step 501.

For example, the address information may include a url. The apparatus for processing a video stream may acquire multiple substreams from a server according to urls of multiple sub video screens.

It is assumed herein that frame structures of the multiple substreams are the same, that is, picture types of the frames of pictures in the multiple substreams are the same.

In addition, because a border of a picture of each substream may not be a border after the substreams are merged into a single stream, in a process in which each substream is coded, a reference picture directed to by a motion vector may be set to be not beyond a picture border corresponding to each substream.

503: The apparatus for processing a video stream arranges the multiple substreams according to the layout mode in step 501, merges arranged multiple substreams into a single stream; and generates an indication message, where the indication message may include first information, second information, and slice data information of each substream, the first information indicates a picture size parameter of the single stream, the second information indicates a slice group parameter of each substream, and the slice data information of each substream indicates a start position of each substream in the single stream.

Specifically, the apparatus for processing a video stream may arrange frames of pictures in the multiple substreams according to the layout mode in step 501, and merge arranged frames of pictures in the multiple substreams into frames of pictures in the single stream. According to the H.264 standard, an arbitrary slice order mode is required if the single stream is formed through merge at this time; therefore, each substream may adopt baseline profile encoding.

According to the H.264 standard and the number of slices contained in each frame of picture in each substream, forming, through merge, the single stream may be classified into the following two situations:

(1) When each frame of picture in each substream merely contains a slice, the single stream may be formed through merge in a mode of "slice_group_map_type=2", that is, each frame of picture in the single stream is formed by multiple rectangular slices, and each slice is a substream.

(2) When each frame of picture in each substream contains one or more slices, the single stream may be formed through merge in a mode of "slice_group_map_type=6", that is, it is specifically specified that each map unit belongs to which slice. Each frame of picture in the single stream is formed by multiple rectangular areas, each area is a substream, and one or more slices are further contained in each area, that is, multiple slices of the corresponding substream.

For the convenience of description, the description is made below through an example in which each frame of picture in each substream contains a slice, but the embodiment of the present invention is not limited thereto; for the situation in which each frame of picture in each substream contains multiple slices, the processing flow is similar, the details are not described herein to avoid duplication.

According to the parameter definition of the H.264 standard, the first information may be sps information. The sps information may indicate a picture size parameter of the single stream, and the process for generating the sps information may be as follows:

Because sps information of the multiple substreams are the same, the apparatus for processing a video stream may select sps information of any substream, obtain parameters pic_height_in_map_units_minus1 and pic_width_in_mbs_minus1 in the sps information by parsing, and set a value of the parameter pic_height_in_map_units_minus1 to a height value of a picture of the single stream minus 1, where a unit of the height value is a map unit; and set a value of the parameter pic_width_in_mbs_minus1 to a width value of a picture of the single stream minus 1, where a unit of the width value is a macroblock. Values of other parameters in the sps information may be kept unchanged; for the specific definition of the other parameters, reference may be made to the H.264 standard. Then, the apparatus for processing a video stream may align bytes behind the parameters pic_height_in_map_units_minus1 and pic_width_in_mbs_minus1 in the sps information.

According to the parameter definition in the H.264 standard, the second information may be picture parameter set (pps) information, where the pps information may indicate a slice group parameter of each substream, and a process for generating the sps information may be as follows:

(1) Because pps information of the multiple substreams are the same, the apparatus for processing a video stream may select pps information of any substream.

(2) The apparatus for processing a video stream may set a slice group type parameter slice_group_map_type in the pps information to 2.

(3) The apparatus for processing a video stream may set a slice group number parameter num_slice_groups_minus1 to the total number of slices of 9 substreams minus 1.

(4) The apparatus for processing a video stream may set a value top_left[ ] in a top left position and a value bottom_right[ ] in a bottom right position for each slice of each substream.

(5) Other parameter in the pps information may be kept unchanged; for the definition of the other parameters, reference may be made to the H.264 standard. The apparatus for processing a video stream may align bytes of the part of the other parameters.

According to the definition in an H.263 standard, slice header data in slice data information of each substream may indicate a start position of each substream in the single stream. Specifically, the apparatus for processing a video stream correspondingly sets a parameter first_mb_in_slice in the slice head data of each substream, where the parameter first_mb_in_slice indicates a position of a first macroblock of a picture of each substream in a picture of the single stream, that is, the start position of each substream in the single stream.

In addition, the slice data information of each sub stream may further include a frame number parameter frame_num and an instantaneous decoding refresh (IDR) picture identity parameter idr_pic_id. The frame_num and the idr_pic_id of each substream are correspondingly set.

504: The apparatus for processing a video stream sends the single stream and the indication message in step 503 to the terminal.

505: The terminal decodes the single stream according to the indication message, to obtain multiple substreams, and displays corresponding multiple sub video screens according to the layout mode in step 501.

Figure 6:
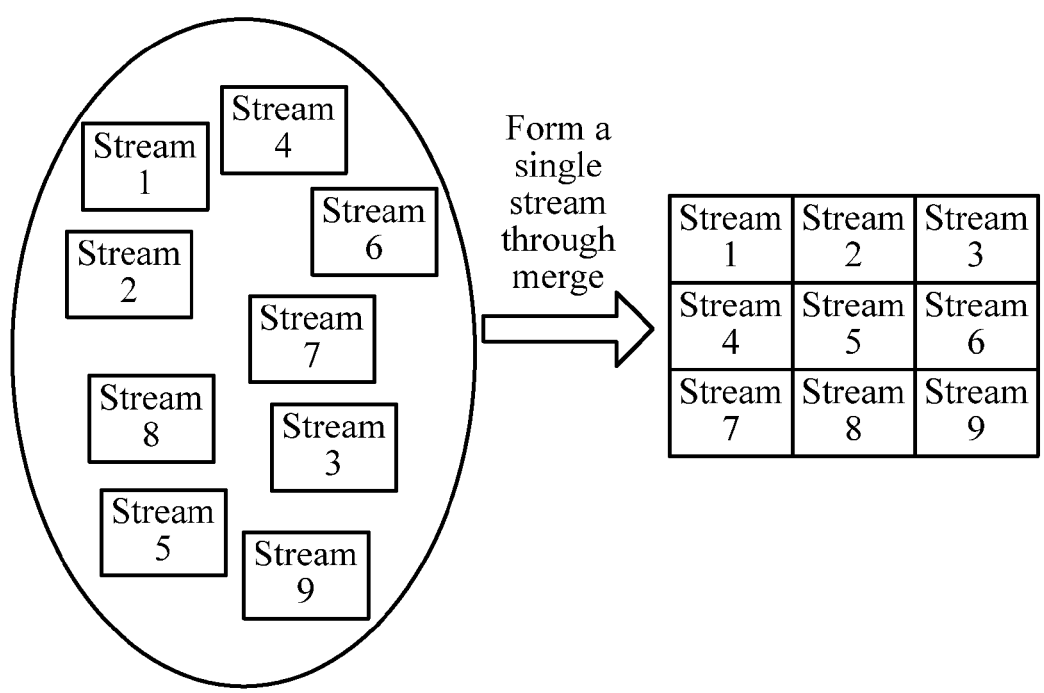
FIG. 6 is a schematic diagram of an example of a process for forming, through merge, a single stream by using the embodiment shown in FIG. 5.

FIG. 6 is a schematic diagram of an example of a process for forming, through merge, a single stream by using the embodiment shown in FIG. 5. In FIG. 6, it is assumed that the number of sub video screens is 9, and the layout mode is a 9-grid mode.

In the embodiment of the present invention, by merging multiple substreams into a single stream according to the layout mode requested by the terminal, the terminal is capable of displaying multiple sub video screens by decoding the single stream, so that the decoding switchover between the multiple substreams is not required, and therefore, the decoding performance of the terminal and the convenience of service implementation can be improved.

Figure 7:
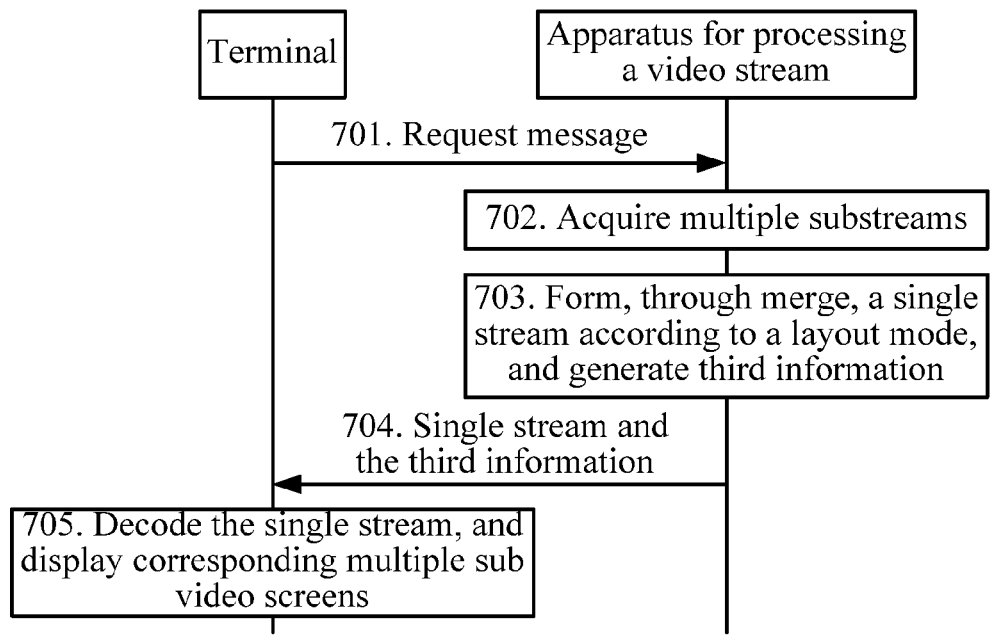
FIG. 7 is a schematic flow chart of a process of a method for processing a video stream according to another embodiment of the present invention.

FIG. 7 is a schematic flow chart of a process of a method for processing a video stream according to another embodiment of the present invention. In FIG. 7, the coding and decoding may be performed without adopting an H.264 standard; the coding and decoding may be performed by adopting other new standards and may be implemented by a self-customized codec.

701: An apparatus for processing a video stream acquires a request message from a terminal, where the request message carries address information of multiple sub video screens and layout information of the multiple sub video screens, and the layout information indicates a layout mode of the multiple sub video screens.

702: The apparatus for processing a video stream acquires corresponding multiple substreams according to the address information in step 701.

For example, the address information may include a url. The apparatus for processing a video stream may acquire multiple substreams from a server according to urls of multiple sub video screens. It is assumed herein that the server codes each substream by using the same frame structure.

In addition, because a border of a picture of each substream may not be a border after the substreams are merged into a single stream, in a process in which each substream is coded, a reference picture directed to by a motion vector may be set to be not beyond a picture border corresponding to each substream.

703: The apparatus for processing a video stream arranges the multiple substreams according to the layout mode in step 701, merges arranged multiple substreams into a single stream, and generates an indication message, where the indication message includes third information, and the third information indicates a picture size parameter of the single stream, the number of substreams, a parameter of a position of each substream in the single stream, and the number of slices in each substream.

The definition in the H.264 standard is still used herein and it is assumed that structures of sps information of the multiple substreams are the same, structures of pps information of the multiple substreams are the same, and structures of slice header data of the multiple substreams are the same; therefore, after the single stream is formed through merge, a set of the sps information, the pps information, and the slice header data may be kept. Because a picture parameter of the single stream is indicated through the third information in the embodiment of the present invention, the information may not be reset.

An example of a data structure of the third information is given bellow. The example is merely for helping a person skilled in the art to understand the embodiment of the present invention, and is not intended to limit the scope of the embodiment of the present invention. A person skilled in the art may obviously make a variety of equivalent modifications or changes according to a provided example of a pseudo-code, for example, the data structure of the third information may further use a similar structure defined in other new video coding and decoding standards, and the modifications or changes should also fall within the scope of the embodiment of the present invention.

```
modify_sub_picture( ){
    new_pic_height_in_map_units_minus1
    new_pic_width_in_mbs_minus1
    num_sub_picture_minus1
    for(i=0; i<= num_sub_picture_minus; i++){
        top_left[i]
        bottom_right[i]
        num_slice_in_sub_picture_minus1
    }
}
```

It may be seen that positions of slices of all the substreams are defined in the above example. Meanwhile, the number of all the slices may be indicated as:

(num_sub_picture_minus1+1)×(num_slice_in_sub_picture_minus1+1).

The third information may be located in front of a first slice of the single stream. In this way, the terminal may be notified, through the third information, that the terminal decodes the single stream according to the third information.

704: The apparatus for processing a video stream sends the single stream in step 703 and the third information included in the indication message to the terminal.

705: The terminal decodes the single stream according to the third information, to obtain multiple substreams, and displays corresponding multiple sub video screens according to the layout mode in step 701.

Specifically, if the terminal receives the third information, the terminal decodes the single stream according to the third information. For example, when each substream includes a slice, the terminal may decode each slice, where an area corresponding to each slice may be defined by top_left[ ] and bottom_right[ ], and the area is independent from another area; if it occurs that a motion vector is beyond the area, the terminal may perform the processing by using the prior art in which the motion vector is beyond a picture area, that is, the terminal may perform padding processing.

If each substream includes multiple slices, the terminal may limit the slices in an area corresponding to the sub stream to perform raster scan, where the area within which the raster scan is performed may be defined by top_left[ ] and bottom_right[ ].

In addition, if the terminal does not receive the third information, the terminal may decode each substream according to the prior art.

In the embodiment of the present invention, by merging multiple substreams into a single stream according to the layout mode requested by the terminal, the terminal is capable of displaying multiple sub video screens by decoding the single stream, so that the decoding switchover between the multiple substreams is not required, and therefore, the decoding performance of the terminal and the convenience of service implementation can be improved.

In addition, in the embodiment of the present invention, a picture parameter of the single stream is indicated through the third information, a data packet of each substream does not need to be modified, and the convenience of the service implementation can be improved.

In the example in FIG. 7, because frame structures of the substreams are the same, sps information and pps information of only one substream need to be kept.

Optionally, in a situation in which the frame structures of the substreams are different, in addition to the third information included by the indication message, the indication message may further include picture information of each substream and slice group information of each substream, the picture information of each substream indicates a picture size parameter of each substream, and the slice group information of each substream indicates a slice group parameter of each substream.

Specifically, the definition in the H.264 standard is still used, where the picture information of each substream may be the sps information of each substream, and the slice group information of each substream may be the pps information of each substream. In this way, the sps information of each substream and the pps information of each substream may be included in the indication message. The sps information and pps information of each substream may be located in front of the first slice of each substream. In this way, in a situation in which the frame structures of the substreams are different, the terminal may further decode the single stream and each substream according to the third information and the sps information and pps information of each substream.

Figure 8:
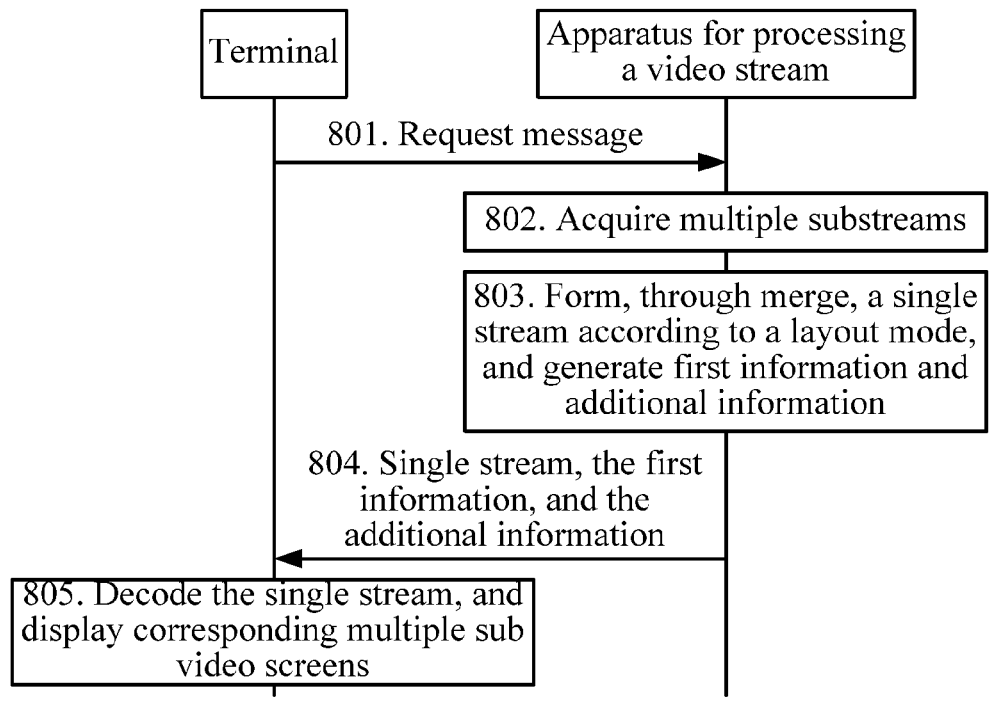
FIG. 8 is a schematic flow chart of a process of a method for processing a video stream according to another embodiment of the present invention.

FIG. 8 is a schematic flow chart of a process of a method for processing a video stream according to another embodiment of the present invention. In FIG. 8, it is assumed that frame structures of substreams are the same.

801: An apparatus for processing a video stream acquires a request message from a terminal, where the request message carries address information of multiple sub video screens and layout information of the multiple sub video screens, and the layout information indicates a layout mode of the multiple sub video screens.

802: The apparatus for processing a video stream acquires corresponding multiple substreams according to the address information in step 801.

For example, the address information may include a url. The apparatus for processing a video stream may acquire multiple substreams from a server according to urls of multiple sub video screens.

In addition, because a border of a picture of each substream may not be a border after the substreams are merged into a single stream, in a process in which each substream is coded, a reference picture directed to by a motion vector may be set to be not beyond a picture border corresponding to each substream.

803: The apparatus for processing a video stream arranges the multiple substreams according to the layout mode in step 801, merges arranged multiple substreams into a single stream, and generates an indication message, where the indication message includes first information and additional information, the first information indicates a picture size parameter of the single stream, and the additional information indicates the number of substreams, a parameter of a position of each substream in the single stream, and the number of slices in each substream.

Specifically, the definition of an H.264 standard is still used, where the first information may be sps information. A process for generating the sps information is as follows:

it is assumed that structures of the sps information of the substreams are the same and structures of pps information of the substreams are the same, the apparatus for processing a video stream may select the sps information of any substream, obtain parameters pic_height_in_map_units_minus1 and pic_width_in_mbs_minus1 in the sps information by parsing, set a value of the parameter pic_height_in_map_units_minus1 to a height value of a picture of the single stream, and set the parameter pic_width_in_mbs_minus1 to a width value of the picture of the single stream.

In addition, the additional information may be added to the sps information, that is, may be a syntax element added in the sps information. An example of a data structure of the additional information is given bellow. The example is merely for helping a person skilled in the art to understand the embodiment of the present invention, and is not intended to limit the scope of the embodiment of the present invention. A person skilled in the art may obviously make a variety of equivalent modifications or changes according to a provided example of a pseudo-code, for example, the data structure of the additional information may further use a similar structure defined in other new video coding and decoding standards, and the modifications or changes should also fall within the scope of the embodiment of the present invention.

```
sub_picture_merge
if(sub_picture_merge==1) {
    num_sub_picture_minus1
    for(i=0; i<= num_sub_picture_minus1; i++){
        top_left[i]
        bottom_right[i]
        num_slice_in_sub_picture_minus1
    }
}
```

Before the multiple substreams are merged into the single stream, a value of sub_picture_merge is 0. After the single stream is formed through merge, the value of sub_picture_merge may be set to 1. In the above example, positions of slices of all the substreams are defined. Meanwhile, the number of all the slices may be indicated as:

(num_sub_picture_minus1+1)×(num_slice_in_sub_picture_minus1+1).

804: The apparatus for processing a video stream sends the single stream in step 803 and the first information and the additional information included in the indication message to the terminal.

805: The terminal decodes the single stream according to the first information and the additional information, to obtain multiple substreams, and displays corresponding multiple sub video screens according to the layout mode in step 801.

Specifically, if the terminal determines that the value of sub_picture_merge is 1, the terminal may decode the single stream according to the first information and the additional information. For example, when each substream includes a slice, the terminal may decode each slice, where an area corresponding to each slice may be defined by top_left[ ] and bottom_right[ ], and the area is independent from another area; if it occurs that a motion vector is beyond the area, the terminal may perform the processing by using the prior art in which the motion vector is beyond a picture area, that is, the terminal may perform padding processing.

If each substream includes multiple slices, the terminal may limit the slices in an area corresponding to the sub stream to perform raster scan, where the area within which the raster scan is performed may be defined by top_left[ ] and bottom_right[ ].

In addition, if the terminal determines that the value of sub_picture_merge is 0, the terminal may decode each substream according to the prior art.

In the embodiment of the present invention, by merging multiple substreams into a single stream according to the layout mode requested by the terminal, the terminal is capable of displaying multiple sub video screens by decoding the single stream, so that the decoding switchover between the multiple substreams is not required, and therefore, the decoding performance of the terminal and the convenience of service implementation can be improved.

Figure 9:
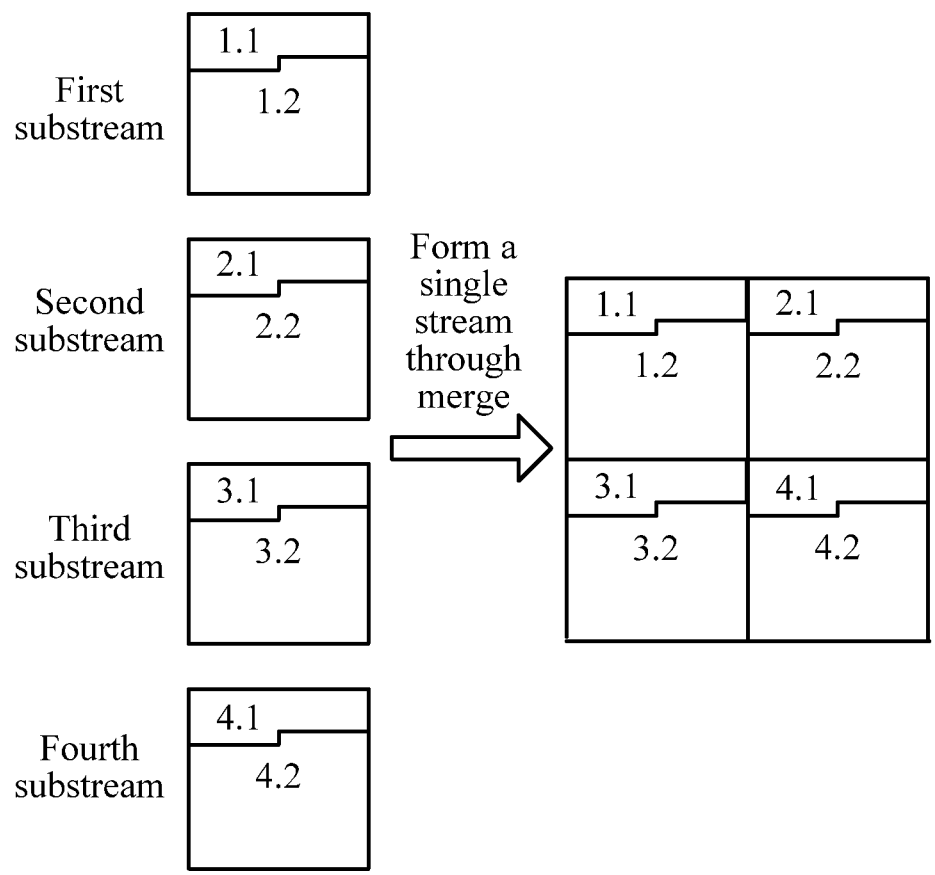
FIG. 9 is a schematic diagram of an example of a process for forming, through merge, a single stream by using the embodiment shown in FIG. 8.

FIG. 9 is a schematic diagram of an example of a process for forming, through merge, a single stream by using the embodiment shown in FIG. 8.

In FIG. 9, it is assumed that the terminal requests 4 sub video screens. A size of a picture corresponding to a substream corresponding to each sub video screen is 320×320, that is, both a length and a width are 20 MB. Each frame of picture in each substream includes 2 slices.

It is assumed that a layout mode, requested by the terminal, of the sub video screens is an N-grid mode, the apparatus for processing a video stream merges the 4 substreams into a single stream according to the N-grid mode; in this way, a size of each frame of picture in the single stream is 640×640, that is, both a length and a width are 40 MB.

According to the embodiment shown in FIG. 8, the indication message includes the first information and the additional information. The definition of H.264 is still used, where the first information may be the sps information, and the additional information may be added to the sps information.

In FIG. 9, it is assumed that a parameter in the additional information may be defined as follows:

```
sub_picture_merge= 1
num_sub_picture_minus1=3
top_left[0]=0              // a first substream
bottom_right[0]=779
num_slice_in_sub_picture_minus1=1
top_left[1]=20             // a second substream
bottom_right[1]=799
num_slice_in_sub_picture_minus1=2
top_left[2]=800            // a third substream
bottom_right[2]=1579
num_slice_in_sub_picture_minus1=2
top_left[3]=820            // a fourth substream
bottom_right[3]=1599
num_slice_in_sub_picture_minus1=2
```

To help a person skilled in the art to better understand the embodiment of the present invention, the description is made below in detail through an example in which the terminal decodes the second substream in the single stream. It should be noted that a process of decoding other substreams is similar; to avoid duplication, the details are not described herein.

According to the additional information, an area corresponding to the second substream is a rectangular area ranging from 20 MB to 799 MB. When a slice 2.1 of the second substream is decoded, it is assumed that a position first_mb_in_slice of a first macroblock of the slice is 0, the raster scan is performed from a start position of the rectangular area, and the slice 2.1 is decoded. When a slice 2.2 of the second substream is decoded, it is assumed that a position first_mb_in_slice of the first macroblock of the slice is 150 MB, the raster scan is performed from a 150$^{th}$ MB of the area, and the slice 2.2 is decoded.

If a motion vector is beyond a corresponding area when the second substream is decoded, a padding operation is performed on the area. The operation is similar to the padding operation on a picture boarder, as regulated in an existing standard; and the picture data of an adjacent area is not used.

In the embodiment of the present invention, by merging multiple substreams into a single stream according to the layout mode requested by the terminal, the terminal is capable of displaying multiple sub video screens by decoding the single stream, so that the decoding switchover between the multiple substreams is not required, and therefore, the decoding performance of the terminal and the convenience of service implementation can be improved.

Figure 10:
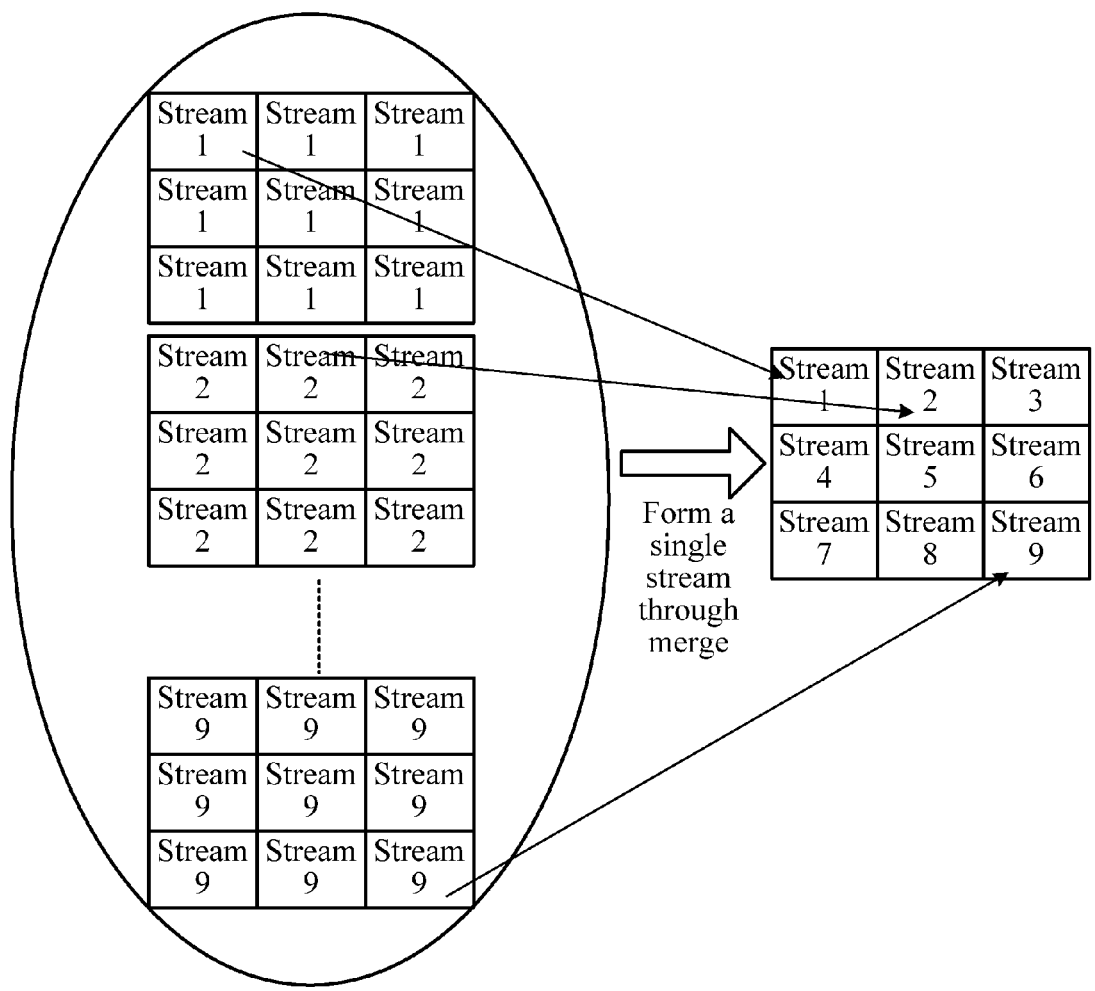
FIG. 10 is a schematic diagram of a process for forming, through merge, a single stream according to another embodiment of the present invention.

FIG. 10 is a schematic diagram of a process for forming, through merge, a single stream according to another embodiment of the present invention.

A request message sent by a terminal may further carry layout information, and the layout information may indicate that a layout mode of multiple sub video screens is an N-grid mode, where the N is a positive integer greater than or equal to 2. A apparatus for processing a video stream may copy each substream into N copies, and arrange the N copies of each substream according to the N-grid mode, select a copy in a corresponding position from the N copies of each substream according to a position of a sub video screen corresponding to each substream in the layout mode, and merge selected copies into a single stream.

In FIG. 10, it is assumed that the number of sub video screens is 9, and the layout mode may be a 9-grid mode. In this way, the apparatus for processing a video stream may copy each substream into 9 copies, arrange the 9 copies according to the 9-grid mode, and perform coding in an arbitrary slice order. According to a position of a sub video screen corresponding to each substream in the 9-grid mode requested by a terminal, copies in corresponding positions are selected from the 9 copies of each substream, and the copies are merged into a single stream.

In the embodiment of the present invention, by merging multiple substreams into a single stream according to the layout mode requested by the terminal, the terminal is capable of displaying multiple sub video screens by decoding the single stream, so that the decoding switchover between the multiple substreams is not required, and therefore, the decoding performance of the terminal and the convenience of service implementation can be improved.

Figure 11:
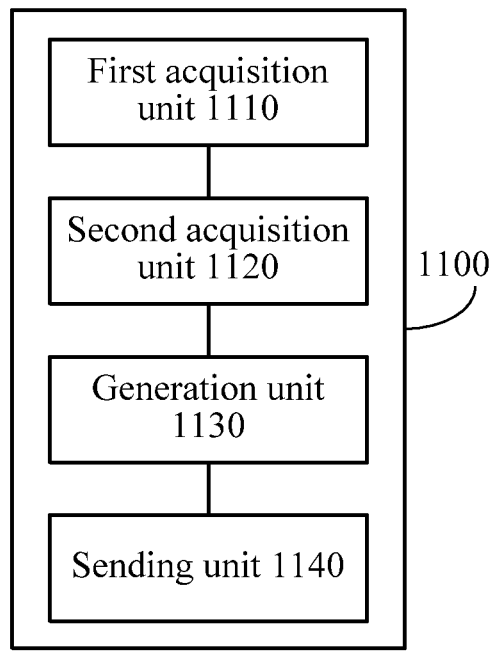
FIG. 11 is a schematic block diagram of an apparatus for processing a video stream according to an embodiment of the present invention.

FIG. 11 is a schematic block diagram of an apparatus for processing a video stream according to an embodiment of the present invention. An apparatus 1100 in FIG. 11 may be located in a server (for example, a server 110 in FIG. 1), that is, may be integrated with the server; and may also be located in a terminal (for example, a terminal 120 in FIG. 1), that is, may be integrated with the terminal, which is not limited in the embodiment of the present invention. The apparatus 1100 includes a first acquisition unit 1110, a second acquisition unit 1120, a generation unit 1130, and a sending unit 1140.

The first acquisition unit 1110 acquires a request message from a terminal, wherein the request message carries address information of multiple sub video screens. The second acquisition unit 1120 acquires, according to the address information, multiple substreams corresponding to the multiple sub video screens in a one-to-one manner. The generation unit 1130 merges the multiple substreams into a single stream, and generates an indication message used to indicate a picture parameter of the single stream. The sending unit 1140 sends the single stream and the indication message to the terminal, so that the terminal decodes the single stream and displays decoded multiple sub video screens according to the indication message.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of service implementation can be improved.

For other functions and operations of the apparatus 1100, reference may be made to processes related to the apparatus for processing a video stream in the method embodiments in FIG. 2 to FIG. 10; and to avoid duplication, the details are not described herein.

Optionally, as an embodiment, the generation unit 1130 may arrange the multiple substreams according to a top-to-bottom arrangement mode of the multiple sub video screens, merge arranged multiple substreams into a single stream, and generate an indication message, where the indication message may include first information and slice data information of each substream, the first information indicates a picture size parameter of the single stream, and the slice data information of each substream indicates a start position of each substream in the single stream.

Optionally, as another embodiment, the request message may further carry layout information, where the layout information indicates a layout mode of multiple sub video screens. The generation unit 1130 may arrange the multiple substreams according to the layout mode, and merge arranged multiple substreams into the single stream.

Optionally, as another embodiment, the generation unit 1130 may generate an indication message, where the indication message may include first information, second information, and slice data information of each sub stream, the first information indicates a picture size parameter of the single stream, the second information indicates a slice group parameter of each substream, and the slice data information of each substream indicates a start position of each substream in the single stream.

Optionally, as another embodiment, the generation unit 1130 may generate an indication message, where the indication message may include third information, and the third information indicates a picture size parameter of the single stream, the number of substreams, a parameter of a position of each substream in the single stream, and the number of slices in each substream.

Optionally, as another embodiment, the indication message may further include picture information of each substream and slice group information of each substream, where the picture information of each substream indicates a picture size parameter of each substream, and the slice group information of each substream indicates a slice group parameter of each substream.

Optionally, as another embodiment, the generation unit 1130 may generate an indication message, where the indication message may include first information and additional information, the first information indicates a picture size parameter of the single stream, and the additional information indicates the number of substreams, a parameter of a location of each substream in the single stream, and the number of slices in each substream.

Optionally, as another embodiment, the request message may further carry layout information, where the layout information indicates that a layout mode of the multiple sub video screens is an N-grid mode, where the N is a positive integer greater than or equal to 2. The generation unit 1130 may copy each substream into N copies, and arrange the N copies of each substream according to the N-grid mode, select a copy in a corresponding position from the N copies of each substream according to a position of a sub video screen corresponding to each substream in the layout mode, and merge selected copies into a single stream.

Optionally, as another embodiment, in a process in which each substream acquired by the second acquisition unit 1120 is coded, a reference picture directed to by a motion vector may be set to be not beyond a picture border corresponding to each substream.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of service implementation can be improved.

Figure 12:
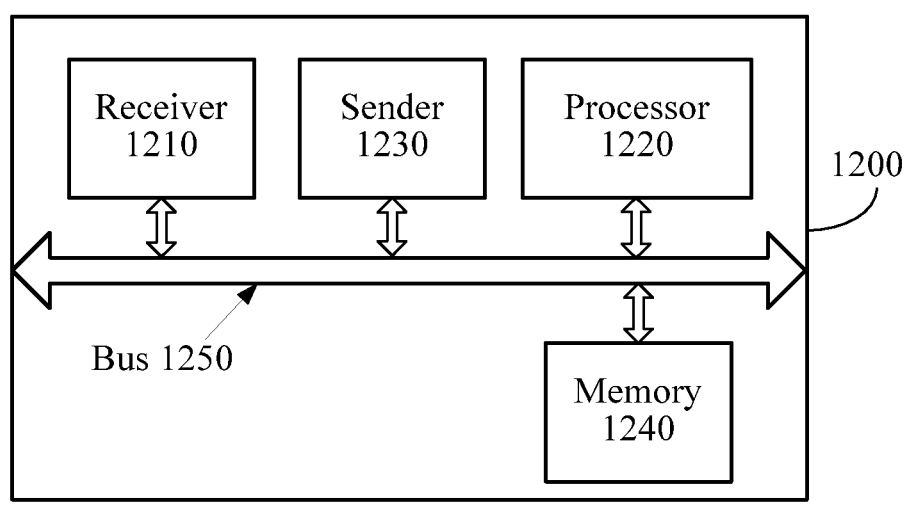
FIG. 12 is a schematic block diagram of an apparatus for processing a video stream according to an embodiment of the present invention.

FIG. 12 is a schematic block diagram of an apparatus for processing a video stream according to an embodiment of the present invention. An apparatus 1200 may be located in a server (for example, a server 110 in FIG. 1), that is, may be integrated with the server; and may also be located in a terminal (for example, a terminal 120 in FIG. 1), that is, may be integrated with the terminal, which is not limited in the embodiment of the present invention. The apparatus 1200 includes a receiver 1210, a processor 1220, a sender 1230, and a memory 1240. The receiver 1210, the processor 1220, the sender 1230, and the memory 1240 are connected through a bus 1250, and may access each other through the bus 1250. The bus 1250 may include a data bus, and may further include a power bus, a control bus, a state signal bus and the like.

The receiver 1210 acquires a request message from a terminal, where the request message carries address information of multiple sub video screens. The processor 1220 acquires, according to the address information, multiple substreams corresponding to the multiple sub video screens in a one-to-one manner. The processor 1220 merges the multiple substreams into a single stream, and generates an indication message used to indicate a picture parameter of the single stream. The sender 1230 sends the single stream and the indication message to the terminal, so that the terminal decodes the single stream and displays decoded multiple sub video screens according to the indication message.

The memory 1240 may include a read-only memory and a random access memory, may store an instruction, or receive a processing result or data of the above receiver 1210, the processor 1220, or the sender 1230.

In the embodiment of the present invention, by merging multiple substreams into a single stream, the terminal is capable of displaying multiple sub video screens by decoding the single stream, so that the decoding switchover between the multiple substreams is not required, and therefore, the decoding performance of the terminal and the convenience of service implementation can be improved.

For other functions and operations of the apparatus 1200, reference may be made to processes related to the apparatus for processing a video stream in the method embodiments in FIG. 1 to FIG. 9; and to avoid duplication, the details are not described herein.

Optionally, as an embodiment, the processor 1220 may arrange the multiple substreams according to a top-to-bottom arrangement mode of the multiple sub video screens, merge arranged multiple substreams into a single stream, and generate an indication message, where the indication message may include first information and slice data information of each substream, the first information indicates a picture size parameter of the single stream, and the slice data information of each substream indicates a start position of each substream in the single stream.

Optionally, as another embodiment, the request message may further carry layout information, where the layout information indicates a layout mode of multiple sub video screens. The processor 1220 may arrange the multiple substreams according to the layout mode, and merge arranged multiple substreams into the single stream.

Optionally, as another embodiment, the processor 1220 may generate an indication message, where the indication message may include first information, second information, and slice data information of each substream, the first information indicates a picture size parameter of the single stream, the second information indicates a slice group parameter of each substream, and the slice data information of each substream indicates a start position of each substream in the single stream.

Optionally, as another embodiment, the processor 1220 may generate an indication message, where the indication message may include third information, the third information indicates a picture size parameter of the single stream, the number of substreams, a parameter of a position of each substream in the single stream, and the number of slices in each substream.

Optionally, as another embodiment, the indication message may further include picture information of each substream and slice group information of each substream, where the picture information of each substream indicates a picture size parameter of each substream, and the slice group information of each substream indicates a slice group parameter of each substream.

Optionally, as another embodiment, the processor 1220 may generate an indication message, where the indication message may include first information and additional information, the first information indicates a picture size parameter of the single stream, and the additional information indicates the number of substreams, a parameter of a position of each substream in the single stream, and the number of slices in each substream.

Optionally, as another embodiment, the request message may further carry layout information, where the layout information indicates a layout mode of the multiple sub video screens is an N-grid mode, where the N is a positive integer greater than or equal to 2. The processor 1220 may copy each substream into N copies, and arrange the N copies of each substream according to the N-grid mode, select a copy in a corresponding position from the N copies of each substream according to a position of a sub video screen corresponding to each substream in the layout mode, and merge selected copies into a single stream.

Optionally, as another embodiment, in a process in which each substream acquired by the processor 1220 is coded, a reference picture directed to by a motion vector may be set to be not beyond a picture border corresponding to each substream.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, the detailed working processes of the foregoing system, apparatus, and unit may refer to the corresponding process in the foregoing method embodiments, and the details will not be described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be merged or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program codes, such as a USB flash disk, a removable hard disk, a read-only memory (ROM), a random access memory (RAM), a magnetic disk, or an optical disk.

The foregoing description is merely about the specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a video stream, comprising:
   acquiring a request message from a terminal, wherein the request message carries address information of multiple sub video screens and layout information, wherein the layout information indicates that a layout mode of the multiple sub video screens is an N-grid mode, and wherein N is a positive integer greater than or equal to 2;
   according to the address information, acquiring multiple substreams corresponding to the multiple sub video screens in a one-to-one manner;

merging the multiple substreams into a single stream, wherein merging the multiple substreams into the single stream comprises:
  copying each substream into N copies, and arranging the N copies of each substream according to the N-grid mode; and
  according to a position of a sub video screen corresponding to each substream in the layout mode, selecting a copy in a corresponding position from the N copies of each substream, and merging selected copies into the single stream;
generating an indication message used to indicate a picture parameter of the single stream; and
sending the single stream and the indication message to the terminal, so that the terminal decodes the single stream and displays decoded multiple sub video screens according to the indication message.

2. The method according to claim 1, wherein the merging the multiple substreams into the single stream, and the generating the indication message used to indicate the picture parameter of the single stream comprise:
  arranging the multiple substreams according to a top-to-bottom arrangement mode of the multiple sub video screens, and merging arranged multiple substreams into the single stream; and
  generating the indication message, wherein the indication message comprises first information and slice data information of each substream, and the first information indicates a picture size parameter of the single stream, and the slice data information of each substream indicates a start position of each substream in the single stream.

3. The method according to claim 1, wherein the generating the indication message used to indicate the picture parameter of the single stream comprises:
  generating the indication message, wherein the indication message comprises first information, second information, and slice data information of each substream,
  wherein the first information indicates a picture size parameter of the single stream, the second information indicates a slice group parameter of each substream, and the slice data information of each substream indicates a start position of each substream in the single stream.

4. The method according to claim 1, wherein the generating the indication message used to indicate the picture parameter of the single stream comprises:
  generating the indication message, and the indication message comprises third information,
  wherein the third information indicates a picture size parameter of the single stream, a number of substreams, a parameter of a position of each substream in the single stream, and a number of slices in each substream.

5. The method according to claim 1, wherein the generating the indication message used to indicate the picture parameter of the single stream comprises:
  generating the indication message, and the indication message comprises first information and additional information,
  wherein the first information indicates a picture size parameter of the single stream, and the additional information indicates a number of substreams, a parameter of a position of each substream in the single stream, and a number of slices in each substream.

6. The method according to claim 2, wherein in a process in which each substream is coded, a reference picture directed to by a motion vector is set to be not beyond a picture border corresponding to each substream.

7. The method according to claim 4, wherein the indication message further comprises picture information of each substream and slice group information of each substream, the picture information of each substream indicates a picture size parameter of each substream, and the slice group information of each substream indicates a slice group parameter of each substream.

8. An apparatus for processing a video stream, comprising:
  a memory for storing computer executable instructions; and
  a processor operatively coupled to the memory, the processor being configured to execute the computer executable instructions to:
  acquire a request message from a terminal, wherein the request message carries address information of multiple sub video screens and layout information, wherein the layout information indicates that a layout mode of the multiple sub video screens is an N-grid mode, wherein N is a positive integer greater than or equal to 2;
  acquire, according to the address information, multiple substreams corresponding to the multiple sub video screens in a one-to-one manner;
  merge the multiple substreams into a single stream, wherein merging the multiple substreams into the single stream comprises:
    copying each substream into N copies, and arranging the N copies of each substream according to the N-grid mode; and
    selecting a copy in a corresponding position from the N copies of each substream according to a position of a sub video screen corresponding to each substream in the layout mode, and merge selected copies into the single stream;
  generate an indication message used to indicate a picture parameter of the single stream; and
  send the single stream and the indication message to the terminal, so that the terminal decodes the single stream and displays decoded multiple sub video screens according to the indication message.

9. The apparatus according to claim 8, wherein the processor is further configured to arrange the multiple substreams according to a top-to-bottom arrangement mode of the multiple sub video screens, and merge arranged multiple substreams into the single stream; and generate the indication message, wherein the indication message comprises first information and slice data information of each substream, the first information indicates a picture size parameter of the single stream, and the slice data information of each substream indicates a start position of each substream in the single stream.

10. The apparatus according to claim 8, wherein the processor is further configured to generate the indication message, and the indication message comprises first information, second information, and slice data information of each substream, the first information indicates a picture size parameter of the single stream, the second information indicates a slice group parameter of each substream, and the slice data information of each substream indicates a start position of each substream in the single stream.

11. The apparatus according to claim 8, wherein the processor is further configured to generate the indication message, and the indication message comprises third information, wherein the third information indicates a picture size parameter of the single stream, a number of substreams, a parameter of a position of each substream in the single stream, and a number of slices in each substream.

12. The apparatus according to claim 8, wherein the processor is further configured to generate the indication message, and the indication message comprises first information and additional information, the first information indicates a picture size parameter of the single stream, and the additional information indicates a number of substreams, a parameter of a position of each substream in the single stream, and a number of slices in each substream.

13. The apparatus according to claim 9, wherein in a process in which each substream is coded, a reference picture directed to by a motion vector is set to be not beyond a picture border corresponding to each substream.

14. The apparatus according to claim 11, wherein the indication message further comprises picture information of each substream and slice group information of each substream, the picture information of each substream indicates a picture size parameter of each substream, and the slice group information of each substream indicates a slice group parameter of each substream.

\* \* \* \* \*